(12) United States Patent
Tamura et al.

(10) Patent No.: US 6,622,382 B2
(45) Date of Patent: Sep. 23, 2003

(54) METHOD FOR PRODUCTION OF EXHAUST GAS PURIFYING CATALYST

(75) Inventors: Nakaba Tamura, Susono (JP); Shigeyoshi Taniguchi, Himeji (JP); Katsuji Tanihira, Himeji (JP); Makoto Horiuchi, Himeji (JP); Ryugo Kakimi, Tatsuno (JP)

(73) Assignees: Toyota Jidosha Kabushiki Kaisha, Aichi (JP); ICT Co., Ltd., Osaka (JP); International Catalyst Technology, Inc., Ridgefield Park, NJ (US)

( * ) Notice: Subject to any disclaimer, the term of this patent is extended or adjusted under 35 U.S.C. 154(b) by 41 days.

(21) Appl. No.: 09/953,028

(22) Filed: Sep. 14, 2001

(65) Prior Publication Data

US 2002/0073542 A1 Jun. 20, 2002

(30) Foreign Application Priority Data

Sep. 18, 2000 (JP) ........................................ 2000-282552

(51) Int. Cl.$^7$ ............................................... B23P 15/00
(52) U.S. Cl. ........................................ 29/890; 29/428
(58) Field of Search ................... 29/890, 428; 422/177, 422/179, 180

(56) References Cited

U.S. PATENT DOCUMENTS

| 5,329,698 | A | | 7/1994 | Abbott | 29/890 |
| 5,724,735 | A | * | 3/1998 | Ickes et al. | 29/890 |
| 6,185,819 | B1 | * | 2/2001 | Bauer et al. | 29/890 |
| 6,389,693 | B1 | * | 5/2002 | Aranda et al. | 29/890 |
| 6,430,811 | B1 | * | 8/2002 | Ohashi et al. | 29/890 |
| 6,484,397 | B1 | * | 11/2002 | Collins et al. | 29/890 |
| 6,497,039 | B1 | * | 12/2002 | Wieres et al. | 29/890 |

FOREIGN PATENT DOCUMENTS

| EP | 0 634 204 A2 | 3/1995 | F01N/7/18 |
| EP | 1 020 621 A2 | 7/2000 | F01N/3/28 |
| JP | 02-264110 | 10/1990 | F01N/3/28 |
| JP | 08-042333 | 2/1996 | F01N/3/28 |
| JP | 11-076837 | 3/1999 | F01N/35/04 |
| JP | 2000-042421 | 2/2000 | B01J/35/04 |

* cited by examiner

Primary Examiner—I Cuda-Rosenbaum
(74) Attorney, Agent, or Firm—Fish & Richardson P.C.

(57) ABSTRACT

A catalytically active component is deposited exclusively on a carrier component by utilizing a container-integrated carrier. Prior to the deposition of the active component on the carrier, the carrier is sealed and then the deposition of the active component is performed.

17 Claims, 6 Drawing Sheets

METHOD FOR PRODUCTION OF EXHAUST GAS PURIFYING CATALYST

BACKGROUND OF THE INVENTION

1. Field of the Invention

This invention relates to a method for the production of a catalyst for purifying exhaust gases, which removes harmful components contained in an exhaust gas from the internal combustion engine such as an automobile by utilizing a container-integrated carrier. Specifically, it relates to a method for the production of a catalyst for purifying exhaust gases, which simultaneously removes harmful components such as carbon monoxide (CO), hydrocarbon (HC), and nitrogen oxides (NOx) contained in an exhaust gas from the internal combustion engine such as an automobile by utilizing the container-integrated carrier.

2. Description of Related Art

Various kinds of exhaust gas purifying catalysts have been proposed for removing harmful components in the exhaust gas, which emanates from the internal combustion engine.

various studies regarding the improvement of engines have been pursued for the purpose of coping with the global reinforcement of the exhaust gas control in recent years. There are effective methods for decreasing the wall thickness of a honeycomb carrier for reducing the thermal capacity or increasing the cell density thereof for improving the geometric surface area with a view of elevating the temperature of a catalyst bed immediately after start of the engine and accelerating the ignition speed of the catalyst. Thus, the use of the carrier of such a quality results in improvement in the purifying property of the catalyst. However, it brings about problems that the carrier or catalyst is degraded in strength because of a decrease in the wall thickness of the carrier, so that the carrier or catalyst is sustained chipping or fracture during transportation of the carrier or during the application of a catalytically active component to the carrier or canning of the catalyst into a converter.

It is disclosed in JP-A-02-264,110, JP-A-08-42,333, and JP-A-11-76,837 that the fracture of the carrier such as the edge chipping mentioned above can be decreased by inserting a catalyst into a metallic cylinder and then immobilizing the inserted catalyst with a mat. These official gazettes, however, include no mention of a method for depositing a catalytically active component to the carrier. It entails disadvantages that the catalyst slurry adheres to part of the container in the case of deposition of the active component to such a container-integrated carrier, that there is out of order in welding the container to the exhaust pipe of a vehicle, that the carrier retainer is degraded in retaining force, and that the catalyst performance is declined.

SUMMARY OF THE INVENTION

This invention, in producing an exhaust gas purifying catalyst by using a ceramic carrier of a thin wall thickness with a view of coping with the reinforcement of the exhaust gas control in recent years, is to provide a method for producing a high-performance exhaust gas purifying catalyst without inflicting damage such as edge chipping on the carrier or without suffering from a catalyst slurry defiling the welded portions of the container, the retainer, and so on.

We have pursued a diligent study to solve the problem in search of a method which comprises obtaining a container-integrated type carrier by inserting a honeycomb carrier into a metallic cylinder in advance of the production of a catalyst and then immobilizing the inserted carrier with a retainer such as a mat, and causing a catalytically active component to deposit on the carrier. We have consequently developed method for producing a catalyst without inflicting damage such as edge chipping on a carrier and without defiling the welded portions of the container or the retaining mat with the active component even if a ceramic carrier with a small wall thickness is used.

Specifically, an object of this invention is accomplished by a method for the production of an exhaust gas purifying catalyst which is characterized by using a container-integrated type carrier having a ceramic carrier retained in a metallic cylinder through a retaining mat, inserting a sealing jig between the metallic cylinder and the carrier, forcing it to the retaining mat, and thereafter depositing a catalytically active component on the carrier.

In accordance with the present method, the catalyst is produced without inflicting damage such as edge chipping upon the carrier that excels in productivity and allows the cost of production to decrease.

In accordance with the present method, the active component is deposited substantially only on the carrier, so that it can be easily managed.

The above and other objects, features and advantages of the present invention will become clear from the following description of the preferred embodiments.

BRIEF DESCRIPTION OF DRAWINGS

The accompanying drawing incorporated in and forming a part of the specification illustrates several aspects of the present invention, and together with the description serves to explain the principles of the invention. In the drawings.

DETAILED DESCRIPTION OF THE PREFERRED EMBODIMENTS

The method for production contemplated by this invention typically comprises:

(A) a step of preparing a container-integrated type carrier, (B) a step of sealing the carrier portion of the container-integrated carrier mentioned above, (C) a step of depositing a catalytically active component on the carrier sealed as described above, (D) a step of optionally removing a surplus portion of the active component deposited as described above, and (E) a step of drying and optionally further calcining the carrier deposited as described above.

The individual steps mentioned above will be explained specifically below with reference to the accompanying drawing.

(A) Step of Preparing the Container-Integrated Carrier

The container-integrated carrier to be used in this invention has an exhaust gas purifying catalyst converter (container) in which a ceramic carrier is packed with a retaining member formed of a heat-resistant inorganic substance and optionally an exhaust gas sealing material. It is further necessary that at least one of the openings in the converter be larger than the external shape of the carrier.

Figure 1:
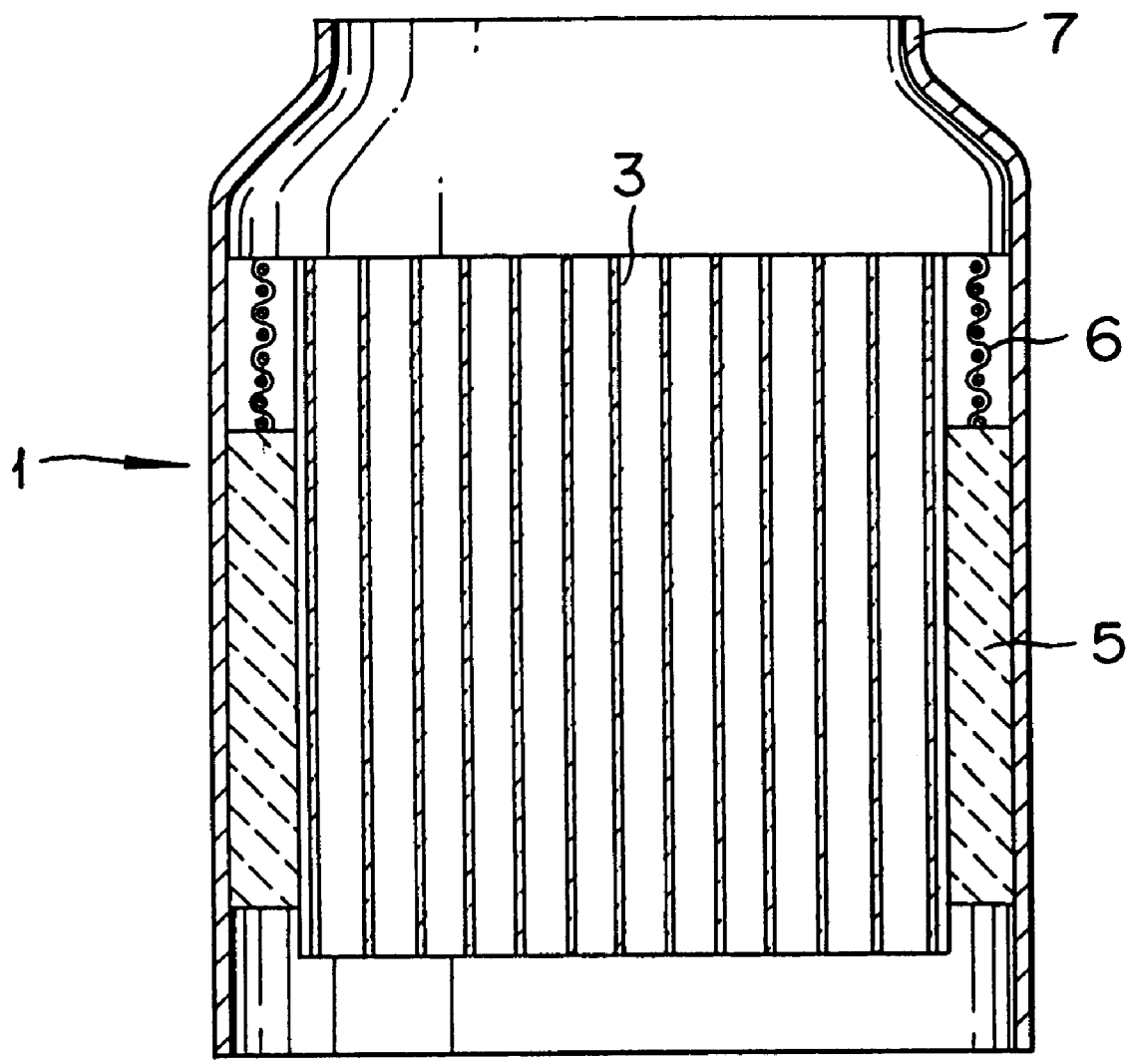
FIG. 1 is a cross section for illustrating one example of the container-integrated carrier to be used in this invention.

FIG. 1 is a diagram for illustrating one example of the container-integrated carrier to be used in this invention. Of course, this invention is not limited to the particular carrier. In the diagrams used herein, like reference numerals denote like members unless otherwise specified. In FIG. 1, a container-integrated carrier 1 has a construction such that the interior of a metallic external cylinder 7 is packed with a ceramic carrier 3 covered on the outer peripheral surface thereof with a retaining or supporting mat 5 and a heat-resistant net 6. The ceramic carrier 3 is not particularly restricted but may include carriers heretofore known to the art. Examples of the ceramic carrier may include honeycomb carriers, which are formed in a circular, elliptic, triangular, or other cross section with materials such as cordierite, mullite, α-alumina, zirconia, titania, titanium phosphate, aluminum titanate, petalite, spondumene, alumino silicate, and magnesium silicate. The mouths (cells) for passing a gas through such carriers may be in the shape of a hexagon, tetragon, triangle, or corrugation, whichever may suit the occasion best. The cell density (the number of cells per a cross section of 6.45 $cm^2$) is properly in the range of 100 to 1500 cells. Hereinafter, the honeycomb carrier shaped in a circular cross section will be described as a typical example unless otherwise specified.

The upper external circumferential surface of the carrier 3 is covered with a known heat-resistant net 6 of metal and the remainder is covered with a known heat-resistant retaining mat 5 of alumina or silica so as to preclude the leakage of the exhaust gas between the carrier 3 and the metallic cylinder 7. Further, the covered carrier is retained within the metallic cylinder 7.

At least one of the openings of the metallic cylinder 7 is larger than the outside diameter of the carrier (the large opening part). The carrier 3 having the external circumferential part thereof covered with the retaining mat 5 and the heat-resistant net 6 is directly disposed in the metallic cylinder in order that the exhaust gas may be allowed to pass from one of the openings through the other. In the construction in which both openings are smaller than the outside diameter of the carrier (the small opening part) such as the construction of a funnel, the active component is not easily deposited uniformly on the carrier and this active component possibly suffers from adhering to the part other than the carrier 3 such as the inner wall surface of the metallic cylinder 7.

The metallic cylinder 7, illustrated in FIG. 1, has one of the openings thereof constricted in the shape of a funnel so as to be connected to the inlet or the outlet pipe, for the exhaust gas from the internal combustion engine such as an automobile, by a known method resorting to welding or using a flange (not shown). The other opening is shaped in order that the carrier 3 having the external circumferential surface thereof covered with the retaining mat 5 and the heat-resistant net 6 may allow the exhaust gas to pass from one of the openings to the other. The active component, therefore, can be introduced and deposited on the carrier 3 through this large opening.

The container-integrated carrier can be manufactured by methods which consist of nipping a ceramic carrier covered with a retaining mat and a heat-resistant net between the two halves into which a metallic cylinder has been split, and which consist of inserting a carrier covered with a retaining mat and a heat-resistant net into a metallic cylinder, and the like.

The weight of the container-integrated carrier is measured (W1) prior to the next sealing step.

(B) Step of Sealing the Carrier Portion of the Container-Integrated Carrier

The term "seal" as used herein refers to an action performed before the active component is deposited on the container-integrated carrier in order to prevent the active component from adhering to the part other than the carrier during the deposition.

Figure 2:
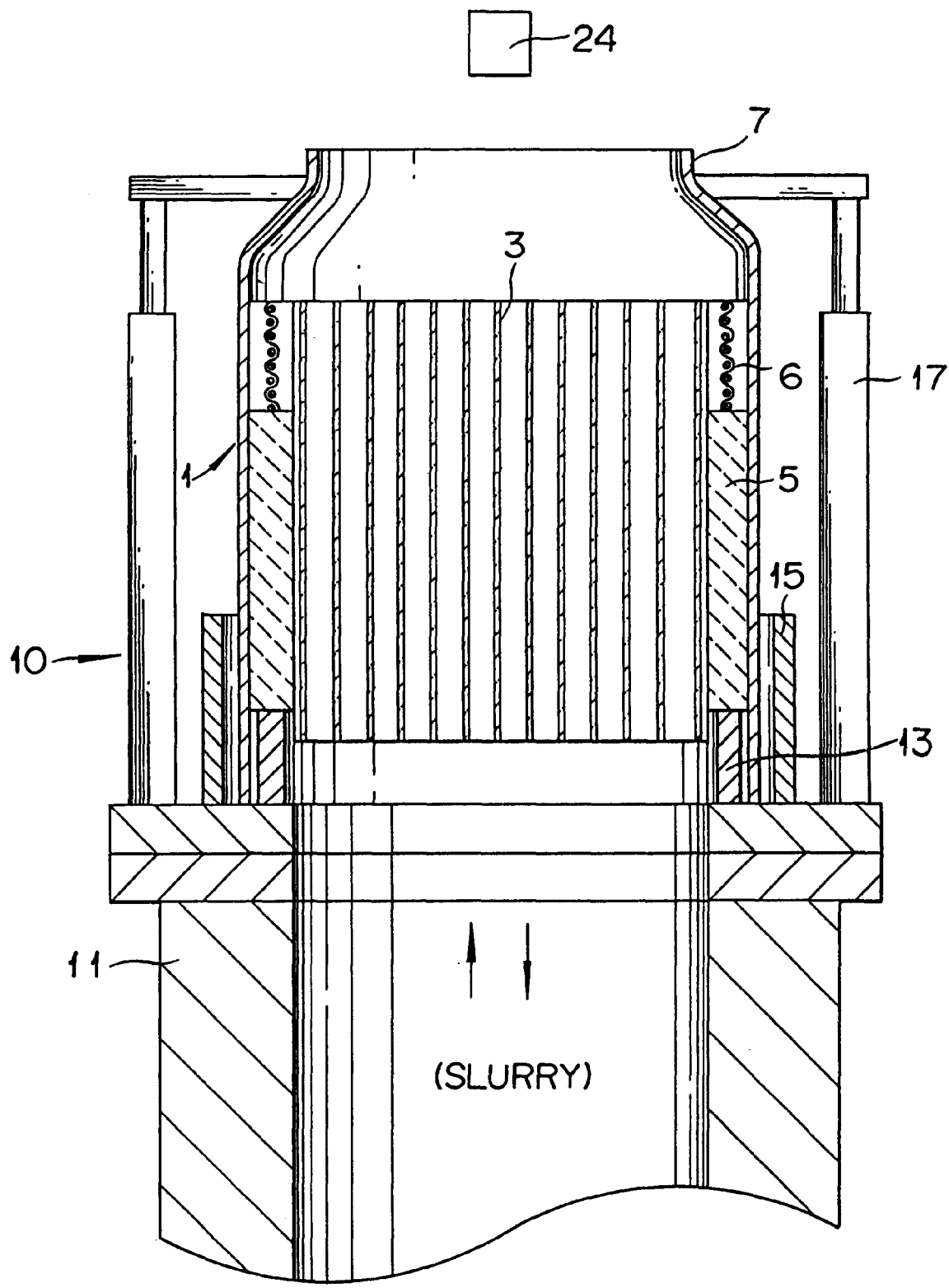
FIG. 2 is a partially cutaway cross section for illustrating the layout of a sealing-device serving to seal the container-integrated carrier and the carrier thereof.

FIG. 2 is a diagram for illustrating the layout of the members of a device for sealing the container-integrated carrier and the container-integrated carrier. In FIG. 2, a sealing device 10 is provided in the lower part thereof with a cylindrical article 11 for transferring a catalytically active component and in the upper part thereof with a cylindrical sealing jig 13 having a smaller outside diameter than the metallic cylinder 7 and a larger inside diameter than the carrier 3, a guide 15 having a larger inside diameter than the metallic cylinder 7, and a sealing holder 17 disposed outside the guide 15 as reckoned from the inside outward.

Firstly, the sealing holder 17 is pulled upwardly. The container-integrated carrier 1 with the large opening part looking downward is mounted on the sealing device 10. In this while, the container-integrated carrier 1 is guided until it reaches the interior of the guide 15, which is made of metallic or plastic substance. The shape of the guide 15 is not particularly restricted but only required to be capable of guiding the container-integrated carrier 1. A cylindrical shape may be adduced as an example. The sealing jig 13 made of a corrosion-resistant material such as a plastic or metallic substance can be used herein. It has a prescribed height or a freely expansible construction. In the case of the prescribed length, the container-integrated carrier 1 is descended until the sealing jig 13 contacts the retaining mat 5 and thereafter the retaining mat 5 shrinks in proportion to the descent of the container-integrated carrier 1. On the other hand, in the case of freely expansible type, it may be operated by a method which comprises initially setting it in a shrunken state and, after the container-integrated carrier has descended and come to a stop, allowing it to extend until it contacts the retaining mat 5 (forced insertion). In this case, by adjusting the height of the sealing jig 13 and/or the pressure of insertion so as to avoid inflicting damage upon the retaining mat 5 and shun the start of inward leakage of the active component, it is possible to seal the carrier 3 with the contact between the sealing jig 13 and the retaining mat 5. Then, the sealing holder 17 is lowered to support the metallic cylinder 7.

Figure 3A:
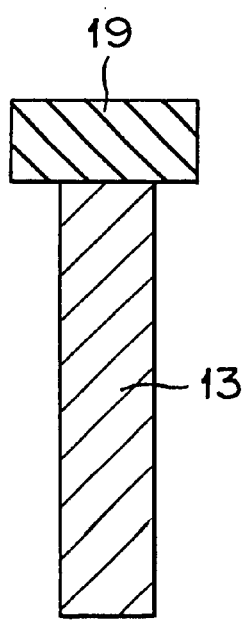
FIGS. 3A–3C are cross sections for illustrating other examples of sealing jigs.
Figure 3B:
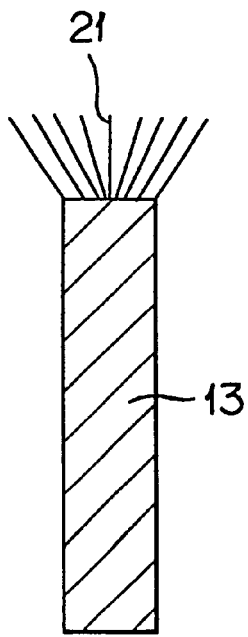
Figure 3C:
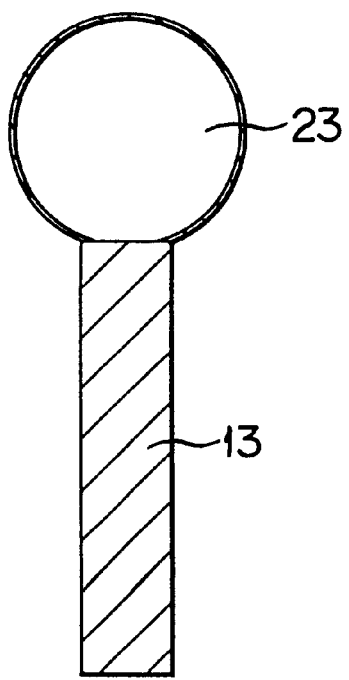

FIG. 3 is a longitudinal cross section intended to be an explanatory diagram for illustrating another example of the sealing jig. In FIG. 3, the left side of the scene forms the internal side of the sealing jig and the right side thereof forms the external side of the sealing jig. FIG. 3A depicts a cylindrical sealing jig 13 provided wholly or partly on the top surface thereof with a baffle plate 19 formed of an elastic material such as rubber, FIG. 3B depicts a cylindrical sealing jig 13 provided wholly or partly on the top surface thereof with a multiple sealing-property-improving-member 21 formed of an elastic material such as metal, plastic, or rubber, and FIG. 3C depicts a cylindrical sealing jig 13 provided wholly or partly on the top surface thereof with an annular elastic member 23 formed of a hollow rubber piece. The thickness of the baffle plate 19 is preferably identical to the thickness of the retaining mat. By providing the baffle plate 19 or the like, the contact area of the baffle and mat can be increased in the case of seal without inflicting damage to the external circumferential surface of the carrier 3, so that it improves the air tightness between them during the deposition of the active component.

Figure 4:
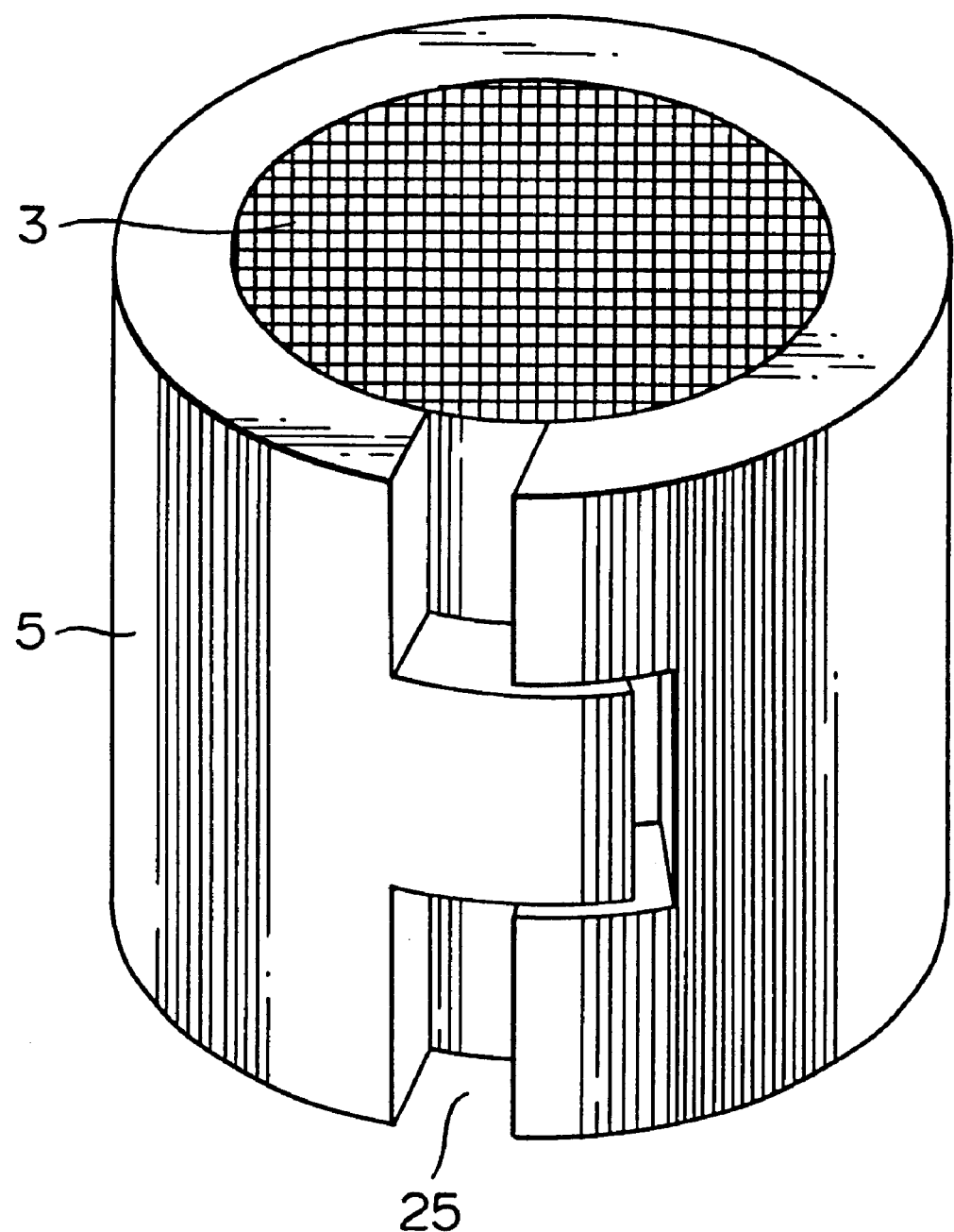
FIG. 4 is a diagram for illustrating one example of the attachment of a retaining mat to a ceramic carrier.

FIG. 4 is a diagram for illustrating one example of the attachment of the retaining mat 5 to the carrier 3. In FIG. 4, it is noted that the retaining mat 5 happens to have a gap 25 in the joint thereof with a view of winding itself around the carrier 3. In the retaining mat 5 as illustrated in FIG. 4, the gap 25 is in danger of inducing a leak even if the seal is formed at all. This situation demands a measure for improvement.

Figure 5:
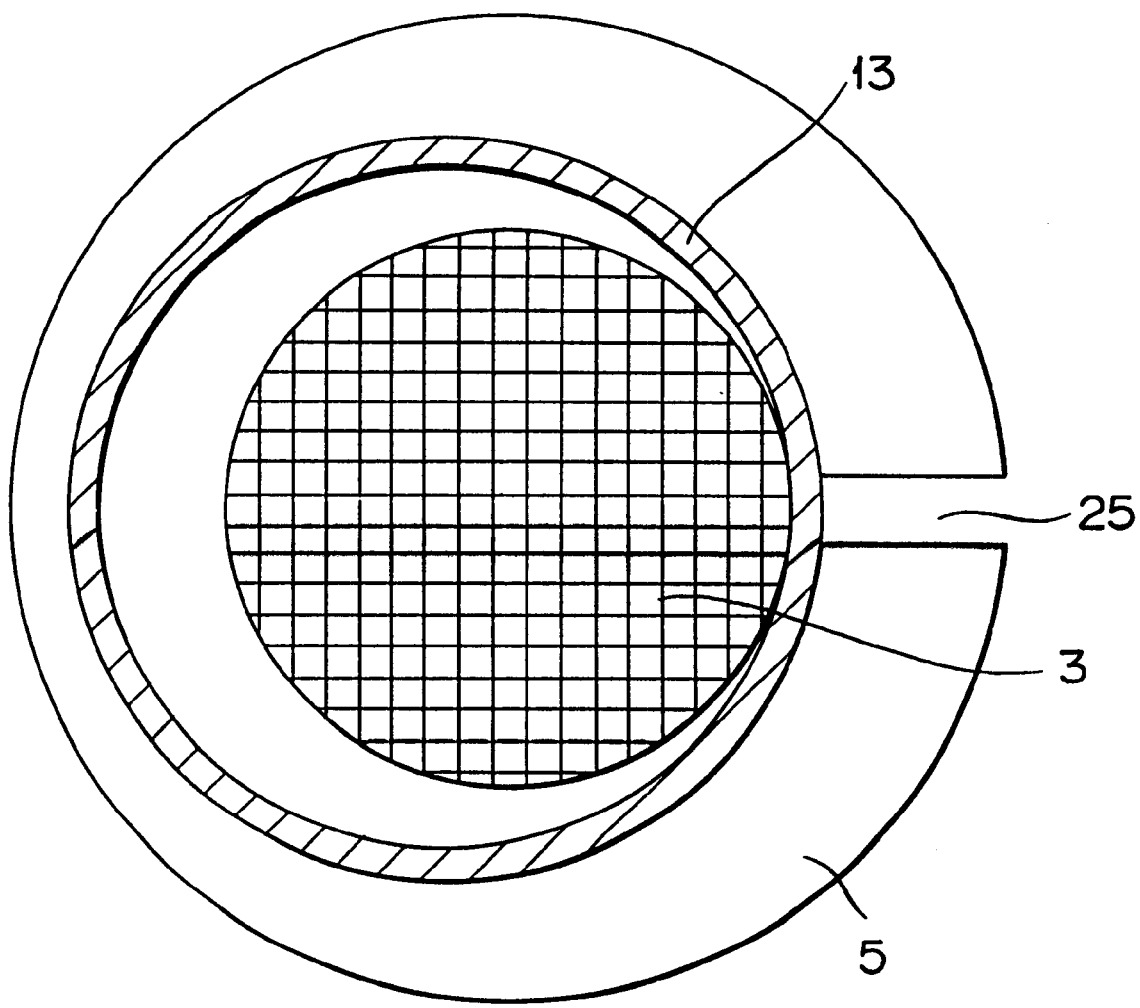
FIG. 5 is a diagram for illustrating one example of the seal to be formed with the sealing jig when the carrier is furnished with a retaining mat including a gap as shown in FIG. 4.

FIG. 5 is a diagram for illustrating one example of the seal between the bottom surface of the carrier in which the retaining mat 5 has a gap as shown in FIG. 4 and the sealing jig. In FIG. 5, a sealing plane is depicted between the carrier 3 provided with the retaining mat 5 and the sealing jig 13, and the cylindrical seal jig 13 is in direct contact with the carrier 3 in the gap 25 portion of the mat 5 to prevent the catalyst component from leaking through the gap 25. In this case, since the sealing jig 13 is in contact with the carrier 3, the pressure of this contact ought to be controlled lest the contact should inflict damage on the carrier 3.

In accordance with this sealing method, the active component substantially contacts the carrier except for the retaining mat 5 interposed between the carrier and the sealing jig 13, so that it does not adhere the active component to the unnecessary parts, and a catalyst converter can be easily obtained by connecting the large opening 7 of the container-integrated carrier by a known method such as welding.

(C) Step of Depositing the Active Component on the Carrier Sealed

This step further embraces (i) a sub-step of introducing a catalyst slurry containing the active component into the carrier through a cylinder for transferring a catalytically active component, which is located in the lower part of the sealing jig, (ii) a sub-step of stopping the introduction of the catalyst slurry for the purpose of enabling the catalyst slurry to reach or not to overflow the top surface of the carrier, and (iii) a sub-step of releasing the catalyst slurry from the carrier.

Now, these sub-steps will be described below in order.

(i) Sub-step of Introducing a Catalyst Slurry Containing the Active Component into the Carrier Through a Cylinder for Transferring a Catalytically Active Component, Which is Located in the Lower Part of the Sealing Jig Examples of the active component may include components that are capable of producing ordinary exhaust gas purifying catalysts, such as noble metals like platinum, palladium, and rhodium; rare earth elements like lanthanum and cerium (oxides thereof); alkaline earth metals like barium (oxides thereof); metals like iron, cobalt, nickel, titanium, and yttrium (oxides thereof); and heat resistant inorganic materials like alumina, ceria, zeolite, and zirconia. Specifically, catalyst slurries containing a noble metal and/or a metal (oxide) and a heat resistant inorganic oxide, oxide slurries containing a heat resistant inorganic oxide and/or a metal (oxide), and noble metal solutions containing a noble metal may be cited. The present sub-step will be described below with respect to the use of a catalyst slurry, for example. It is not limited to this particular example.

In the present invention, the viscosity of the catalyst slurry is not particularly restricted but may be at 18° C. in the range of 1 to 100,000 cps, preferably 5 to 50,000 cps, more preferably 5 to 10,000 cps, most preferably 10 to 5,000 cps and especially 10 to 1,000 cps. The solid concentration of the catalyst slurry is not particularly limited but may be in the range of 1 to 80% by weight, preferably 3 to 70% by weight, and most preferably 5 to 60% by weight. If the viscosity and solid concentration are beyond these ranges, it sometimes suffers from the disadvantages. If the viscosity and solid concentration are too small, it requires repeated depositions, thus inducing an increased cost in the production of the catalyst. Adversely, if the viscosity and solid concentration are too high, there is possibility that the catalyst slurry will not invade into the cells fully.

The method for introducing the catalyst slurry into the carrier fulfills its role by establishing contact between the carrier and the catalyst slurry, but is required to prevent the catalyst slurry from adhering to other portions than the carrier portion. Thus, it may be performed by application of pressure or by means of decompression. The pressure method comprises pressing the catalyst slurry by a known means such as a pump thereby advancing it through the active component-transferring cylinder 11 into the carrier 3. The decompression method which comprises drawing the catalyst slurry through the upper part of the container-integrated carrier by a known means such as a vacuum pump and advancing it through the active component-transferring cylinder 11 into the carrier 3. In these methods, the pressure method proves favorable because it can directly confirm the state of the catalyst slurry in the proximity of the top surface of the carrier. It is possible to apply both of two methods mentioned above, at the same time.

In accordance with the pressure method, a cylindrical catalyst slurry chamber or a catalyst slurry chamber having a diameter substantially equal to or larger than the active component-transferring cylinder 11 is formed below the cylinder and the catalyst slurry can be ascended in the cylinder 11 by exerting pressure on the catalyst slurry in the cylindrical catalyst slurry chamber by a known pressing means such as a pump or a piston or decompressing the whole catalyst slurry chamber.

The speed at which the introduction of the catalyst slurry is performed is not particularly restricted, but may be cited that the catalyst slurry is advanced at a fixed speed, or intermittently, or at a high speed at first and at a lowered speed near the top surface of the carrier.

(ii) Sub-step of Stopping the Introduction of the Catalyst Slurry for the Purpose of Enabling the Catalyst Slurry to Reach the Top Surface of the Carrier The catalyst slurry should be prevented from copiously overflowing the top surface of the carrier since it is required to avoid substantially adhering to other portions than the carrier. Thus, it becomes necessary to stop the introduction of the catalyst slurry by application of pressure at least before the catalyst slurry reaches the top surface of the carrier. The position for stopping the catalyst slurry is preferably decided by taking into account conditions such as the solid concentration in the catalyst slurry, the viscosity of the catalyst slurry, and the number of cells of the carrier in advance since the timing of the stop of the introduction varies with such factors.

Alternatively, the required stop may be attained by providing above the top surface of the carrier a known liquid level controlling sensor 24 and causing the scale reading of this sensor to match the introduction speed of the catalyst slurry by application of pressure lest the catalyst slurry should overflow the top surface.

(iii) Sub-step of Releasing the Catalyst Slurry from the Carrier

The method for releasing the catalyst slurry from the carrier may include methods which comprise relieving the catalyst slurry of the pressure either immediately or after the elapse of a prescribed time after the step of stopping the introduction of the catalyst slurry thereby allowing the catalyst slurry in the carrier to fall spontaneously, and blowing a gas such as air or nitrogen from the top surface side of the carrier thereby expelling the catalyst slurry, and which comprise discharging the catalyst slurry by drawing it through the bottom surface of the carrier by a pump.

Alternatively, only a prescribed amount of the catalyst slurry, which corresponds to the amount to be deposited on the carrier, is used, so that no blowing or no suction is necessary for removing the surplus portion of the catalyst slurry. The prescribed amount of the catalyst slurry can be calculated based on the specific gravity of the catalyst slurry, the volume of the carrier, and the amount of the active component to be deposited on the carrier. In this process, it is unnecessary to use a sensor.

(D) Step of Removing a Surplus Portion of the Active Component from the Carrier

The method for removing a surplus portion of the active component from the carrier may include methods which comprise blowing a gas such as air or nitrogen through the top surface of the carrier thereby removing the catalyst slurry, and comprise drawing such a gas through the bottom surface of the carrier thereby removing the catalyst slurry.

Figure 6:
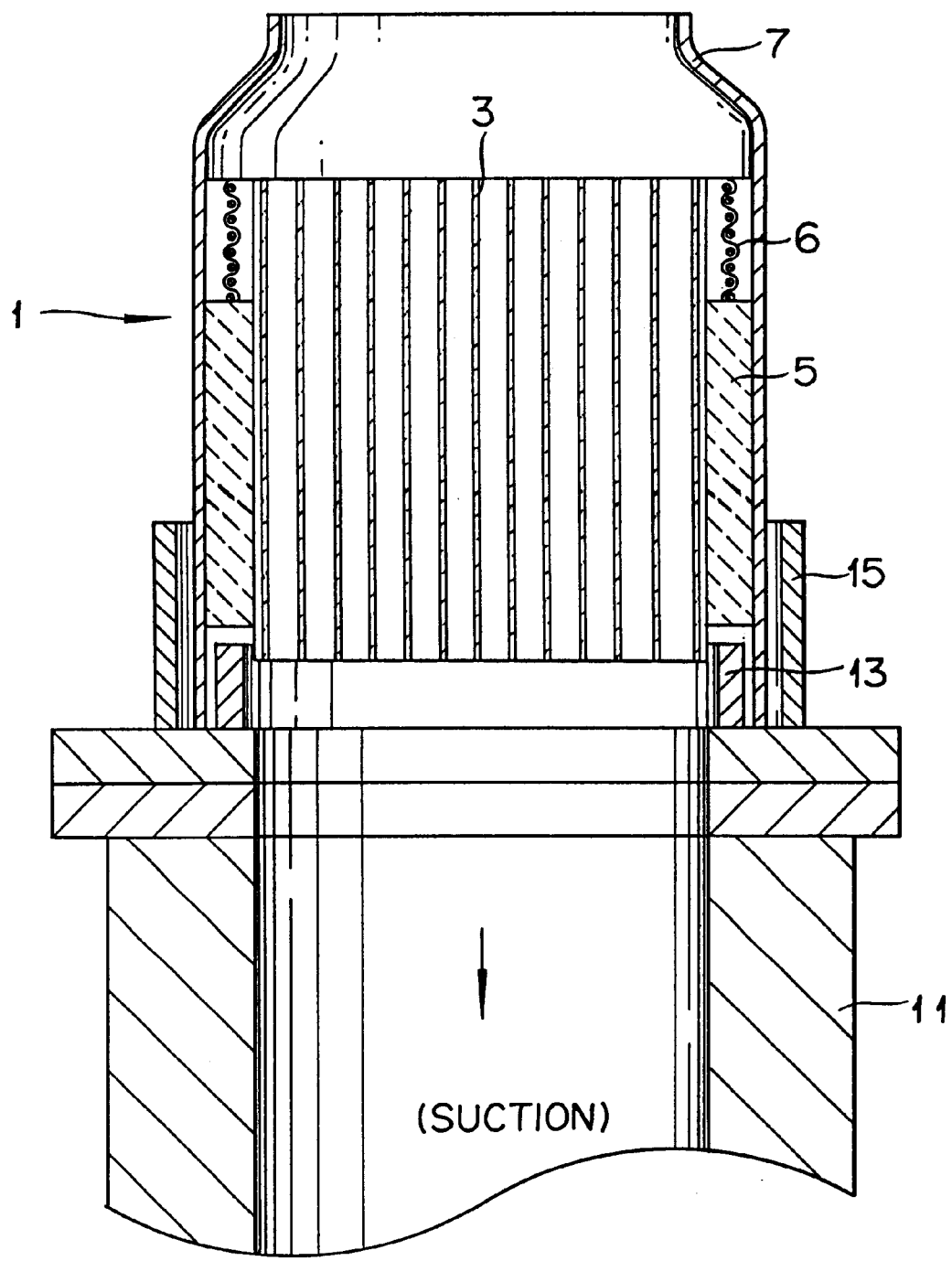
FIG. 6 is a cross section for illustrating a method for removing a surplus portion of the active component by means of suction.

FIG. 6 is a diagram for explaining the method for removing the surplus portion of the active component by means of suction. In FIG. 6, the catalyst slurry is released from the carrier by inducing spontaneous fall of the catalyst slurry and then the surplus portion of the catalyst slurry is expelled through the active component-transferring cylinder 11 by decompressing the cylinder by a known pump such as a vacuum pump. Even at this step, the catalyst slurry cannot be deposited on the container-integrated carrier portion other than the carrier because the catalyst slurry is expelled through this cylinder 11. This step may be performed either in the same place as the active component has been deposited or another place.

Incidentally, the present step may be performed except for the aforementioned step of (iii) for releasing the catalyst slurry from the carrier.

The weight of the container-integrated carrier is measured (W2) after the surplus portion of the catalyst slurry has been removed. Thus, the weight increased by the deposition (W2–W1) is determined.

The portion of the container-integrated carrier that is beyond the prescribed range of weight is removed from this production line. As a result, the exhaust gas purifying catalyst which has the active component deposited in a prescribed amount is obtained.

When no surplus portion of the slurry is present on the carrier, this step can be omitted.

(E) Step of Drying and Calcining the Deposited Carrier

The container-integrated carrier is dried by passing therethrough a hot wind such as air or nitrogen after the step of (D). Though the temperature of this hot wind is not particularly limited as long as it is capable of drying the carrier that has the slurry deposited thereon, it is generally preferred to be in the range of 100° C. to 200° C. Further, the dried carrier is calcined, if necessary, by passing a hot gas such as heated air or nitrogen therethrough. Though the temperature of the heated air or nitrogen is not particularly limited as long as it is capable of calcining the dried carrier, it is preferably in the range of 200° C. to 800° C., more preferably in the range of 400° C. to 500° C.

The process pertinent hereto has been described with respect to the step of depositing the catalyst slurry once. It is not limited to the sole deposition of the catalyst slurry. It is permissible to perform the deposition of the catalyst slurry up to a plurality of repetitions. In accordance with the repeated procedure, a multi-layered catalyst can be produced. In addition to the above, when different types of slurries are used, it can provide a catalyst with several kinds of catalyst active layers laminated.

This can be performed in several combinations: for instance, to deposit an oxide slurry and then perform the deposition of different metal solutions; to deposit the catalyst slurry and then perform the deposition of a noble metal solution; and to deposit a noble metal solution and then perform the deposition of an oxide slurry, if necessary, up to a plurality of repetitions.

Further, the production that is performed by partially or wholly automating the individual steps falls in the scope of the present invention.

EXAMPLES

Now, this invention will be described more specifically below with reference to examples. It is not limited to these examples but may be performed in altered or modified mode without departure from the spirit of this invention.

Example 1

An exhaust gas purifying catalyst was produced by using a container-integrated carrier, constructed as illustrated in FIG. 1, in which a 0.9 liter of thin-wall ceramic carrier (cell density: 900, cell thickness: 2 mils, cross section: circle) has been packed as follows.

The weight (W1) of the container-integrated carrier was 850 g (step A).

The carrier portion of the large opening part of the container-integrated carrier was sealed (step B) by a sealing device, as illustrated in FIG. 2.

The carrier was deposited with the catalyst slurry. This catalyst slurry had a solid concentration of 46% and a viscosity of 300 cps (liquid temperature: 18° C). In accordance with the pressure method, a cylindrical catalyst slurry chamber having an inside diameter substantially equal to the inside diameter of the active component-transferring cylinder was fixed in the lower part of the active component-transferring cylinder and the catalyst slurry was pushed up at a fixed speed into the carrier through the active component-transferring cylinder by applying pressure to the cylindrical catalyst slurry chamber from below by a pump (i). The catalyst slurry was raised up to close proximity of the top surface of the carrier while the rise of the catalyst slurry was observed from the top surface side of the carrier for the purpose of confirming the degree of the rise and then the rise was stopped (ii).

After the arrival of the catalyst slurry at the top surface of the carrier was confirmed, the cylindrical catalyst slurry chamber was separated from the active component-transferring cylinder and then the catalyst slurry was allowed to fall spontaneously from the carrier (iii) (step C).

Then, from the carrier having a catalyst slurry, the surplus portion of the active component was removed by evacuating the carrier via the active component-transferring cylinder by a vacuum pump. When the weight of the container-integrated carrier (W2) was measured, it was found to be 1157 g, a value confirmed to be in the prescribed range (W2–W1) (step D).

Thereafter, the deposited carrier was dried using air at 1500° C. for 60 minutes and further calcined using air at 500° C. for 60 minutes.

By adopting this method, it was possible to perform the required deposition of the active component without defiling the container and retaining mat. Since the use of the sealing device similarly prevented the large opening part of the metallic cylinder from being covered with the active component, welding without any removing operation can easily connect the large opening part. Specifically, it was possible to produce the catalyst without inflicting any damage such as edge chipping even by the use of the thin-wall carrier.

Example 2

An exhaust gas purifying catalyst was produced by the use of such a container-integrated carrier as illustrated in FIG. 1 in which a gap occurred in a retaining mat as illustrated in FIG. 4 based on a method for newly introducing a step of causing a cylindrical sealing jig to contact the carrier in the gap portion existing in the retaining mat as illustrated in FIG. 5.

The other conditions used herein were the same as those in Example 1.

By adopting the method described above, it was possible to secure a satisfactory sealing property and deposit on the carrier a catalytically active component without defiling devices such as containers.

In Example 2, it was possible to produce a thin-wall ceramic carrier without inflicting damage such as edge chipping on the carrier by controlling the contact pressure so as to avoid inflicting damage on the carrier in the same manner as in Example 1.

Example 3

An exhaust gas purifying catalyst was produced by using a container-integrated carrier, constructed as illustrated in FIG. 1, in which a 0.9 liter of thin-wall ceramic carrier (cell density: 900, cell thickness: 2 mils, cross section: circle) has been packed as follows.

The weight (W1) of the container-integrated carrier was 850 g (step A).

The carrier portion of the large opening part of the container-integrated carrier was sealed (step B) by a sealing device, as illustrated in FIG. 2.

The carrier was deposited with the catalyst slurry. This catalyst slurry had a solid concentration of 46% and a viscosity of 300 cps (liquid temperature: 18° C.). In accordance with the pressure method, a cylindrical catalyst slurry chamber having an inside diameter substantially equal to the inside diameter of the active component-transferring cylinder was fixed in the lower part of the active component-transferring cylinder and the catalyst slurry was pushed up at a fixed speed into the carrier through the active component-transferring cylinder by applying pressure to the cylindrical catalyst slurry chamber from below by a pump (i). The catalyst slurry was raised up to close proximity of the top surface of the carrier while the rise of the catalyst slurry was observed from the top surface side of the carrier for the purpose of confirming the degree of the rise and then the rise was stopped (ii).

After the arrival of the catalyst slurry at the top surface of the carrier was confirmed, the cylindrical catalyst slurry chamber was separated from the active component-transferring cylinder and then the surplus portion of the catalyst slurry was removed by evacuation using a pump from the carrier (iii) (step C).

When the weight of the container-integrated carrier (W2) was measured, it was found to be 1160 g, a value confirmed to be in the prescribed range (W2–W1).

Thereafter, the deposited carrier was dried using air at 150° C. for 60 minutes and further calcined using air at 500° C. for 60 minutes.

By adopting this method, it was possible to perform the required deposition of the active component without defiling the container and retaining mat. Specifically, it was possible to produce the catalyst without inflicting any damage such as edge chipping even by the use of the thin-wall carrier.

Example 4

An exhaust gas purifying catalyst was produced by using a container-integrated carrier, constructed as illustrated in FIG. 1, in which a 0.9 liter of thin-wall ceramic carrier (cell density: 900, cell thickness: 2 mils, cross section: circle) has been packed as follows.

The weight (W1) of the container-integrated carrier was 850 g (step A).

The carrier portion of the large opening part of the container-integrated carrier was sealed (step B) by a sealing device, as illustrated in FIG. 2.

The carrier was deposited with the catalyst slurry. This catalyst slurry had a solid concentration of 46% and a viscosity of 300 cps (liquid temperature: 18° C.). In accordance with the pressure method, a cylindrical catalyst slurry chamber having an inside diameter substantially equal to the inside diameter of the active component-transferring cylinder was fixed in the lower part of the active component-transferring cylinder. A prescribed weight of slurry, which is used to be deposited on the carrier, was taken into the cylindrical catalyst slurry chamber. The catalyst slurry was pushed up at a fixed speed into the carrier through the active component-transferring cylinder from the cylindrical catalyst slurry chamber by a pump.

When the weight of the container-integrated carrier (W2) was measured, it was found to be 1158 g, a value confirmed to be in the prescribed range (W2–W1) (step D).

Thereafter, the deposited carrier was dried using air at 150° C. for 60 minutes and further calcined using air at 500° C. for 60 minutes.

By adopting this method, it was possible to perform the required deposition of the active component without defiling the container and retaining mat. Specifically, it was possible to produce the catalyst without inflicting any damage such as edge chipping even by the use of the thin-wall carrier.

The entire disclosure of Japanese Patent Application No. 2000-282552 filed on Sep. 18, 2000, including specification, claims, drawings and summary is incorporated herein by reference in its entirety.

What is claimed is:

1. A method for the production of an exhaust gas purifying catalyst, comprising:

preparing a container-integrated carrier wherein a ceramic carrier is retained in a metallic cylinder through the medium of a retaining mat and the metallic cylinder has two openings, one of them being larger than the external shape of the carrier;

sealing the carrier from the large opening side of the metallic cylinder with a seal device which comprises:
a cylinder for transferring a catalytically active component; on the top part thereof in order from the inner side to the outer side, a cylindrical seal jig having a smaller outside diameter than the above transferring cylinder and a larger inside diameter than the carrier; a guide having a larger inside diameter than the outside diameter of the metallic cylinder; and a seal holder outside the guide; and
depositing the active component on the carrier.

2. A method according to claim 1, further comprising removing a surplus of the active component from the deposited carrier.

3. A method according to claim 1, wherein the carrier is a honeycomb carrier with a plurality of holes.

4. A method according to claim 1, further comprising covering part of the sides of the carrier with a heat resistant net instead of part of the mat.

5. A method according to claim 1, wherein said sealing is performed by inserting a sealing jig between the metallic cylinder and the carrier to contact with the retaining mat and compress thereto.

6. A method according to claim 5, wherein the inserting is performed with the sealing jig, the sealing jig being at least one of the following devices:
(a) a cylindrical sealing jig provided on the top surface thereof with a baffle plate having a width identical to the thickness of the retaining mat;
(b) a cylindrical sealing jig having a pileous top surface; and
(c) a cylindrical sealing jig having a hollow elastic member disposed annularly on the top surface thereof.

7. A method according to claim 1, wherein the active component is introduced from the bottom side of the carrier.

8. A method according to claim 1, wherein the active component is at least one member selected from the group consisting of a noble metal; an oxide of a rare earth element, alkaline earth metal or metal; and a heat resistant inorganic oxide.

9. A method according to claim 8, wherein the active component includes a slurry of the noble metal and/or the oxide and the inorganic oxide or a solution of the noble metal.

10. A method according to claim 7, wherein a supply of the active component is stopped not to overflow from the top surface of the carrier.

11. A method according to claim 2, wherein said removing includes blowing a gas from the top face of the carrier and/or sucking a gas from the bottom face thereof.

12. A method according to claim 1, wherein said deposition is performed by measuring an amount of a catalytically active component to be just deposited to the carrier and then introducing the measured active component into the carrier.

13. A method according to claim 1, further comprising drying the deposited carrier.

14. A method according to claim 13, further comprising calcining the dried carrier.

15. A method for the production of an exhaust gas purifying catalyst, comprising:
preparing a container-integrated carrier wherein a ceramic carrier is retained in a metallic cylinder; sides of the carrier are wrapped with a mat being capable of combining each other at the ends thereof; and the metallic cylinder has two openings, one of them being larger than the external shape of the carrier;
sealing the carrier from the large opening side of the metallic cylinder with a seal device which comprises:
a cylinder for transferring a catalytically active component; on the top part thereof in order from the inner side to the outer side, a cylindrical seal jig having a smaller outside diameter than the above transferring cylinder and a larger inside diameter than the carrier; a guide having a larger inside diameter than the outside diameter of the metallic cylinder; and a seal holder outside the guide; and
depositing the active component on the carrier.

16. A method according to claim 15, wherein a sealing jig is made to contact and seal the bottom face of the carrier in the part of a gap existing in the mat intervening between the metallic cylinder and the carrier.

17. A method according to claim 16, wherein the inserting is performed with the sealing jig, the sealing jig being at least one of the following devices:
(a) a cylindrical sealing jig provided on the top surface thereof with a baffle plate having a width identical to the thickness of the retaining mat;
(b) a cylindrical sealing jig having a pileous top surface; and
(c) a cylindrical sealing jig having a hollow elastic member disposed annularly on the top surface thereof.

* * * * *